United States Patent
Ikeda et al.

[11] Patent Number: 5,822,785
[45] Date of Patent: Oct. 13, 1998

[54] DATA TRANSFER USING LOCAL AND GLOBAL ADDRESS TRANSLATION AND AUTHORIZATION

[75] Inventors: Masayuki Ikeda; Shigeru Nagasawa; Naoki Shinjo; Teruo Utsumi; Masami Dewa; Haruhiko Ueno; Kazushige Kobayakawa; Kenichi Ishizaka, all of Kawasaki, Japan

[73] Assignee: Fujitsu Limited, Kawasaki, Japan

[21] Appl. No.: 951,295

[22] Filed: Oct. 16, 1997

Related U.S. Application Data

[63] Continuation of Ser. No. 112,203, Aug. 26, 1993, abandoned.

[30] Foreign Application Priority Data

Dec. 18, 1992 [JP] Japan ................................. 4-338504

[51] Int. Cl.$^6$ .................................................. G06F 12/10
[52] U.S. Cl. ......................... 711/209; 711/211; 711/207; 395/200.75
[58] Field of Search .................................... 711/203, 209, 711/211, 207, 206; 395/200.75

[56] References Cited

U.S. PATENT DOCUMENTS

| | | | |
|---|---|---|---|
| 4,136,385 | 1/1979 | Gannon | 711/202 |
| 4,149,242 | 4/1979 | Pirz | 711/5 |
| 4,455,647 | 6/1984 | Gueldner | 370/62 |
| 4,485,438 | 11/1984 | Myrmo et al. | 711/100 |
| 4,742,447 | 5/1988 | Duvall et al. | 395/406 |
| 4,843,542 | 6/1989 | Dashiell et al. | 711/119 |
| 4,881,164 | 11/1989 | Hailpern et al. | 711/207 |
| 4,928,224 | 5/1990 | Zulian | 375/309 |
| 5,008,811 | 4/1991 | Scalzi et al. | 711/207 |
| 5,036,459 | 7/1991 | den Haan et al. | 395/200.67 |
| 5,095,427 | 3/1992 | Tanaka et al. | |
| 5,117,350 | 5/1992 | Parrish et al. | 711/1 |
| 5,182,803 | 1/1993 | Bagnoli et al. | 395/299 |
| 5,247,629 | 9/1993 | Casamatta et al. | 711/206 |
| 5,274,789 | 12/1993 | Costa et al. | 711/206 |
| 5,319,758 | 6/1994 | Arai et al. | 711/209 |
| 5,319,761 | 6/1994 | Charot et al. | 711/207 |

FOREIGN PATENT DOCUMENTS

| | | |
|---|---|---|
| A-0 409 285 | 1/1991 | European Pat. Off. |
| WO-A-82 01095 | 4/1982 | WIPO |

*Primary Examiner*—Jack A. Lane
*Attorney, Agent, or Firm*—Staas & Halsey

[57] ABSTRACT

A system information storage section stores access information showing attributes for accessing a storage peculiar to a processor and storages peculiar to other processors by relating the access information to data. The system information storage section stores space identifying information for identifying each of plural kinds of virtual spaces allocated according to applications of the storages. A plurality of address translation sections translate virtual addresses into real addresses, corresponding to the plural kinds of virtual spaces on the basis of the access information. A selection section selects any one of the plurality of address translation sections on the basis of the space identifying information. A transfer control section reads the data of the storage on the basis of the real address obtained by the selected address translation section and transfers the data to other processors together with the access information and the space identifying information.

24 Claims, 15 Drawing Sheets

FIG.14

WRITE LL UNAUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | UNAUTHORIZATION |
| LOCAL | GLOBAL | AUTHORIZATION |
| LOCAL | LOCAL | UNAUTHORIZATION |

FIG. 15

READ LL UNAUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | AUTHORIZATION |
| LOCAL | GLOBAL | UNAUTHORIZATION |
| LOCAL | LOCAL | UNAUTHORIZATION |

FIG. 16

LL AUTHORIZATION TABLE

| TRANSMITTING PROCESSOR | RECEIVING PROCESSOR | AUTHORIZATION/ UNAUTHORIZATION |
|---|---|---|
| GLOBAL | GLOBAL | AUTHORIZATION |
| GLOBAL | LOCAL | AUTHORIZATION |
| LOCAL | GLOBAL | AUTHORIZATION |
| LOCAL | LOCAL | AUTHORIZATION |

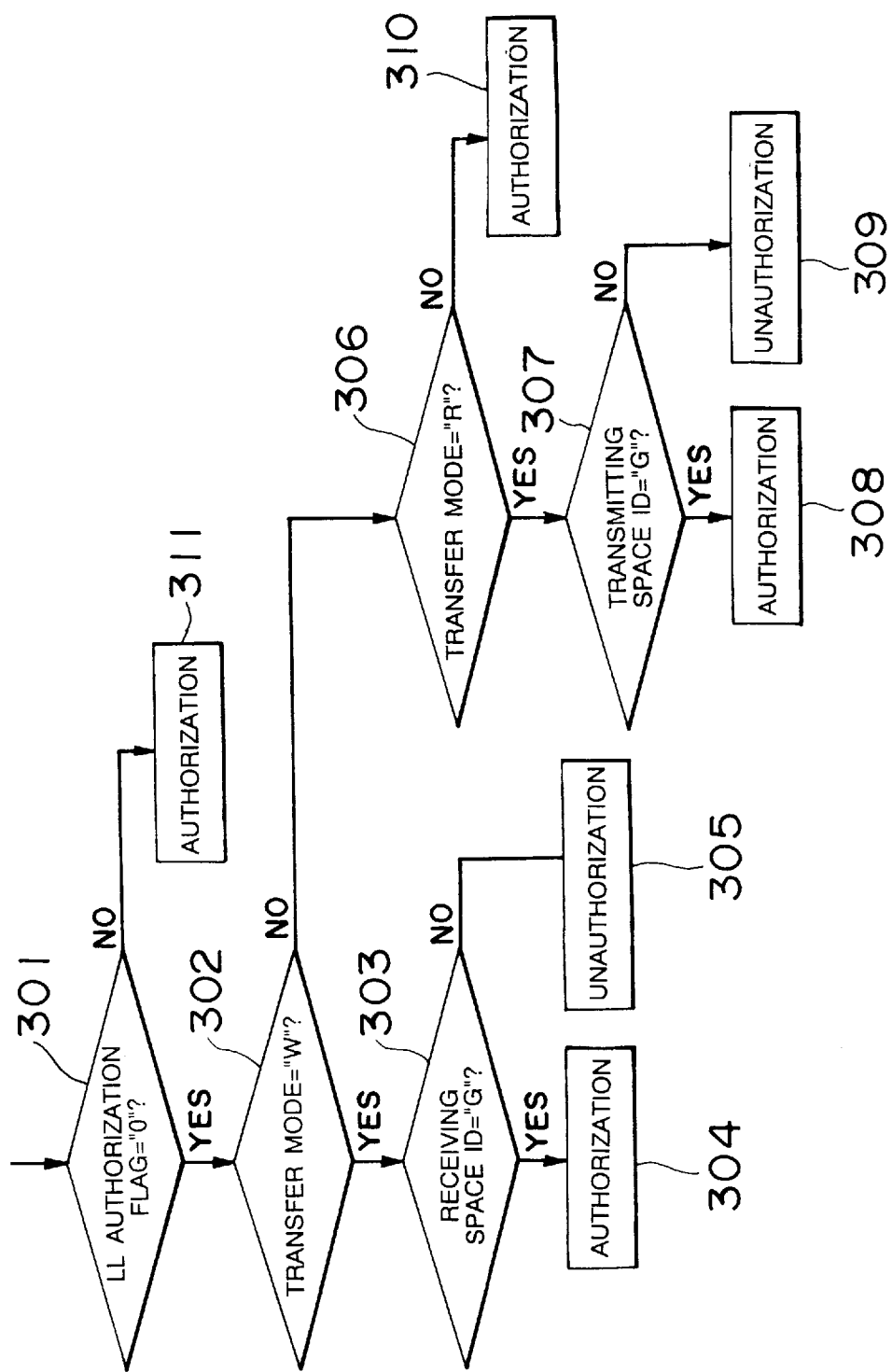

DATA TRANSFER USING LOCAL AND GLOBAL ADDRESS TRANSLATION AND AUTHORIZATION

This application is a continuation of application Ser. No. 08/112,203, filed Aug. 26, 1993, now abandoned.

BACKGROUND OF THE INVENTION

1. Field of the Invention

The present invention relates generally to a multiprocessor system for executing processes in parallel by effecting processor-to-processor communications and, more particularly, to a method of and an apparatus for transferring and processing data in the multiprocessor system.

2. Description of the Related Art

In recent years, there have been demanded a speed-up and an increase in capacity of a computer system. Concomitantly, a parallel processing technology has been required, wherein a plurality of processors are prepared, and parallel processing is executed by distributing processes to those processors.

One of multiprocessor technologies involving the use of the plurality of processors provides a multiprocessor system in which a main storage is subdivided into a plurality of storages to be subordinated under the plurality of processors which perform the processes in parallel. Such a multiprocessor system is termed, e.g., a distributed memory parallel processing system, wherein the respective processors operate in parallel while effecting data communications with each other via a communication system, and some batch processing is executed at a high speed by the plurality of processors as a whole.

Generally, in this type of multiprocessor system, when an arithmetic process is conducted, the data needed for the arithmetic by a first processor for executing the arithmetic are transferred from second one or more processors having the data (retained in a memory area of a main storage ancillary to each processor) to the first processor (a memory area of a main storage ancillary to the processor). Just when the data required for the arithmetic are all stored in (the memory area of the main storage ancillary to) the first processor, the first processor executes the arithmetic. Then, an arithmetic result thereof is stored in a memory area of a main storage of a third processor which is to retain or store the arithmetic result. The first through third processors in this case may not all be separate processors. At least a part of those processors are common in some cases. The processor system executes one united parallel processing in conformity with a series of procedures described above. The respective processors repeatedly execute the above-mentioned processing while taking synchronization with each other, thus effecting the parallel processing.

In the processor-to-processor communications in the multiprocessor system described above, when transmitting the data existing in the memory area of the main storage of a processor A to the other processor B, a supervisor program generally manages queuing of a data transfer to the other processor B. Then, when a user program generates an interruption of a data transfer request to the supervisor program, the supervisor program creates headers of a transfer packet, thereby making a request for the data transfer.

Based on this method, however, the interruptions from the user program to the supervisor program frequently take place, resulting in a larger overhead. Under such circumstances, there is proposed a method of transferring the data without using the supervisor program to reduce the overhead through intermediary of the supervisor program. The following is an explanation of this method.

A transfer request queue is provided with a write pointer and a read pointer. The write and read pointers are managed directly by the user program. Then, one virtual space is set in the main storage. The user program accesses the main storage through an address translation table for an address translation between a virtual address and a real address. The data transfer process is thus conducted.

The conventional multiprocessor system, however, presents the following problems.

That is, when changing contents of the address translation table of a certain processor, it is required that the contents be coincident by updating the contents of the address translation tables of all the processors. In this case, an operating system (OS) executes a synchronizing process. This synchronizing process is a process of shifting the process to the next one just when updating the contents of all the address translation tables by causing the process to wait until the contents of all the address translation tables are updated to the changed contents.

If such a synchronization process is performed, the overhead of the operating system increases, whereas the system performance declines.

SUMMARY OF THE INVENTION

It is a primary object of the present invention to provide a method of and an apparatus for transferring and processing data which are capable of reducing an overhead of a data transfer in a multiprocessor system.

A data transfer processing system according to this invention comprises a plurality of processing units and a communication system. The plurality of processing units include storages for storing the data and execute predetermined processes. The communication system transfers the data and system information between the plurality of processing units.

The respective processing units are constructed as follows and execute the processes in parallel.

A system information storage section stores access information indicating attributes for accessing the storage in a processing unit and storages of other processing units by relating the access information to the data. At the same time, the system information storage section stores space identifying information for identifying each of plural kinds of virtual spaces allocated according to applications of the storages. The storage is a main storage, for example. The system information storage section is, e.g., a transfer queue stored in the main storage.

A plurality of address translation sections translate virtual addresses into real addresses, corresponding to the plural kinds of virtual spaces on the basis of the access information stored in the system information storage section.

A selection section selects any one of the plurality of address translation sections on the basis of the space identifying information stored in the system information storage section.

A transfer control section reads the data of the storage on the basis of the real address translated by the address translation section selected by the selection section. The transfer control section transfers the data to other processing units together with the access information and the space identifying information as well.

Herein, the plural kinds of virtual spaces may be a global space used in common to all the processing units and a local space used intrinsically to each processing unit.

The plurality of address translation sections described above may be a local address translation section and a global address translation section. The local address translation section translates the virtual address into the real address to access the local space. The global address translation section translates the virtual address into the real address to access the global space.

Further, the transfer control section effects the transfer process through a packet consisting of headers containing the access information and the space identifying information and body data related to the headers.

The access information contains pieces of information about a designation of the processing unit to be received, a data read or write transfer mode, a body data length, a transmitting address and a receiving address.

Further, the system may be provided with a write pointer section and an information write section. The write pointer section indicates where the access information is written in the system information storage section. The information write section sequentially writes the access information to the system information storage section by incrementing a pointer value of the write pointer section.

Additionally, the system may be provided with a read pointer section and a network transfer control section. The read pointer section indicates where the data transfer process is finished in the system information storage section. The network transfer control section judges whether or not a read pointer value of the read pointer section coincides with a write pointer value of the write pointer section after the information write section has finished writing the access information. The network transfer control section reads, if the read pointer value does not coincide with the write pointer value, the data until the read pointer value coincides with the write pointer value.

A data buffer for retaining the headers and the data may be provided between the storage and the communication system. Then, the transfer control section reads the header from the system information storage section to the data buffer. The transfer control section reads the body data related to the header from the storage on the basis of the header.

Further, there may be provided a selection circuit for selecting any one of the virtual address and the real address from the selection section in accordance with an address translation control signal by inputting this address translation control signal showing whether or not the virtual address is translated into the real address.

The information stored in the local and global address translation tables may contain an invalid bit indicating that a write and read of the data are invalid and an access protection bit indicating whether or not a write access is inhibited.

There may be provided a space authorization control section for controlling an authorization of a write or read response access of the data between the virtual space of the transmitting processing unit to which the data is to be transmitted and the virtual space of the receiving processing unit which is to receive the data.

The space authorization control section includes, e.g., an authorization flag generating section and a space authorization discriminating section. The authorization flag generating section generates an authorization flag indicating whether to authorize the data transfer between the virtual spaces of the transmitting processing unit and of the receiving processing unit. The space authorization discriminating section discriminates the authorization of the data transfer between the virtual spaces by referring to the authorization flag from the authorization flag generating section, the write or read response transfer mode, the transmitting space identifying information and the receiving space identifying information.

Further, the system may be provided with a write unauthorization table, a read unauthorization table and an authorization table. The write unauthorization table registers an authorization or unauthorization of writing of the data between the virtual spaces. The read unauthorization table registers an authorization or unauthorization of reading of the data between the virtual spaces. The authorization table registers an authorization of writing and reading of the data between the virtual spaces. The space authorization discriminating section discriminates the authorization of the data transfer between the virtual spaces by referring to the tables corresponding to the authorization flag, the transfer mode, the transmitting space identifying information and the receiving space identifying information.

In the system described above, the individual spaces are independently usable by providing the plurality of virtual spaces. When updating the address translation section in a certain space, the synchronization may be taken between the minimum number of processors required.

Further, the write to the local space is inhibited in the write transfer, thereby protecting the local space. Besides, the overhead of the data transfer is reduced by giving a permission of the local-to-local data transfer to a certain program and controlling the authorization flag. The local write is inhibited with respect to other programs. It is therefore possible to flexibly protect the local space in accordance with the program.

BRIEF DESCRIPTION OF THE DRAWINGS

Other objects and advantages of the present invention will become apparent during the following discussion in conjunction with the accompanying drawings, in which:

FIG. 14 is a diagram showing contents of a write LL unauthorization table in the system of FIG. 3;

FIG. 15 is a diagram showing contents of a read LL unauthorization table in the system of FIG. 3;

FIG. 16 is a diagram showing contents of an LL authorization table in the system of FIG. 3;

FIG. 18 is an explanatory flowchart showing processing actions of an LL authorization discriminating section in the system of FIG. 3.

DETAILED DESCRIPTION OF THE PREFERRED EMBODIMENTS

[Embodiment 1]

Figure 1:
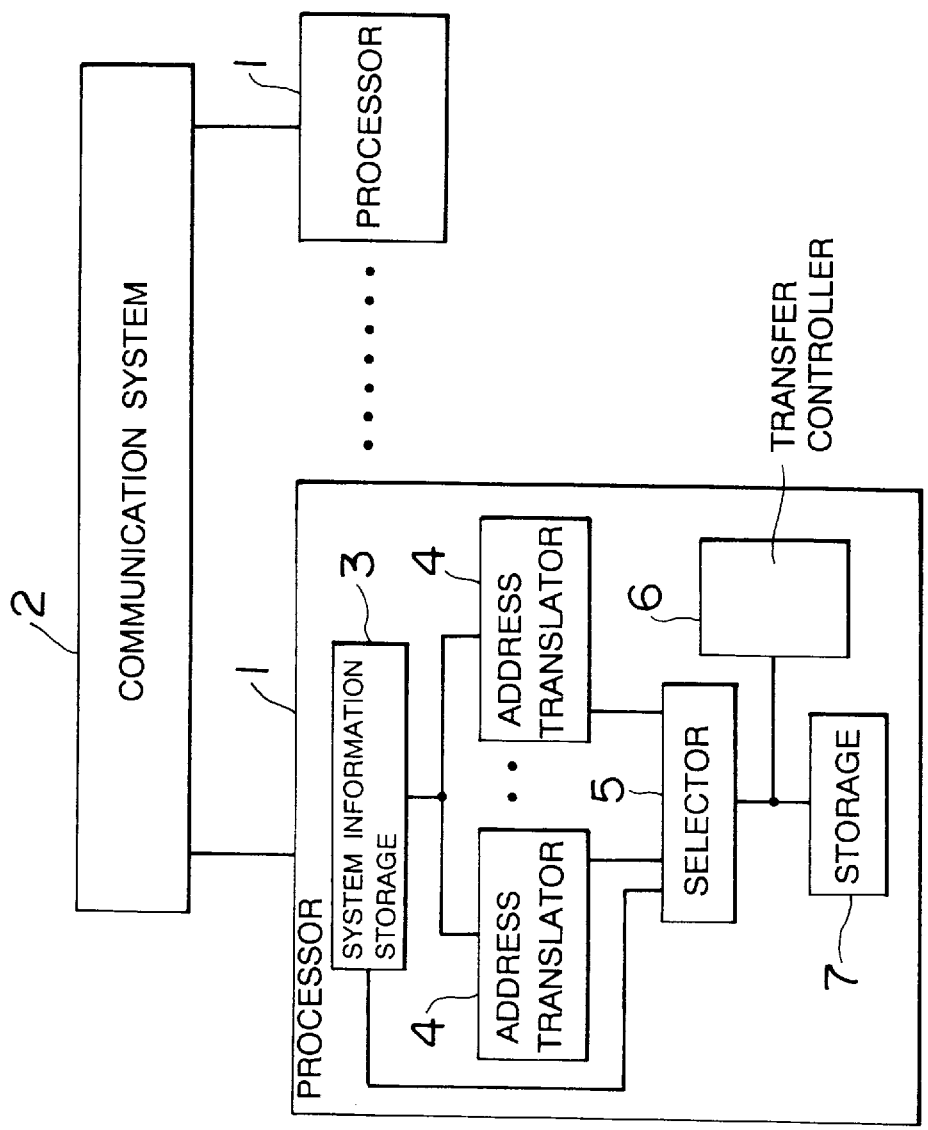
FIG. 1 is a block diagram showing an architecture of a multiprocessor system to which a data transfer system is applied in a first embodiment of the present invention.

FIG. 1 illustrates an architecture of a data transferring/processing system in a first embodiment of the present invention.

The data transferring/processing system in FIG. 1 includes a plurality of processing units 1 and a communication system 2 for performing communications between these processing units 1. Each processing unit 1 has a storage 7 for storing the data and executes predetermined processes. The communication system 2 transfers the data and system information between the plurality of processing units 1.

The processing units 1 are each constructed specifically as follows and execute the processes in parallel.

System information storage section 3 stores access information showing attributes for accessing the storage 7 in the processing unit 1 and the storage 7 in other processing unit 1 by relating the information to the data. Stored also therein is space identifying information for identifying plural kinds of virtual spaces allocated according to applications of the storage 7. The storage 7 is a main storage, for example. The system information storage section 3 may involve the use of a part of the main storage and stores information such as, e.g., a transfer queue.

A plurality of address translating sections 4 translate virtual addresses into real addresses, corresponding to the plural kinds of virtual spaces on the basis of the access information stored in the system information storage section 3.

A selection section 5 selects one of the plurality of address translating sections 4 on the basis of the space identifying information stored in the system information storage section 3.

A transfer control section 6 reads the data from the storage 7 and transfers the data together with above-mentioned access information and space identifying information to other processing unit 1 in accordance with the real addresses obtained by the address translating section 4 selected by the selection section 5.

Figure 2:
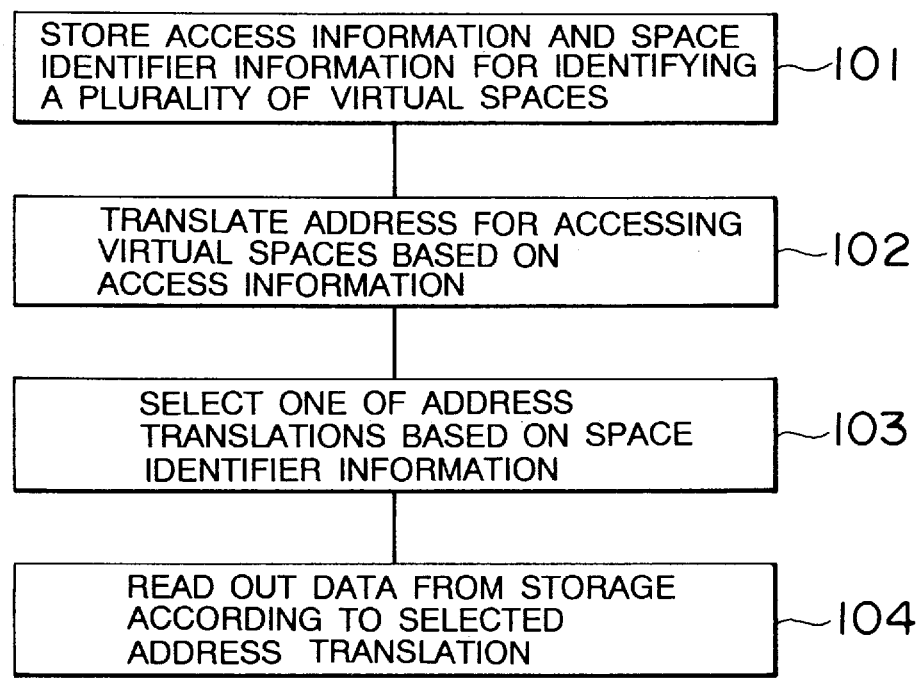
FIG. 2 is an explanatory flowchart showing actions of the system of FIG. 1.

Next, actions of the data transferring/processing system described above will be explained with reference to a flowchart of FIG. 2.

The system transfers the data and the system information between the plurality of processing units 1, whereby the respective processing units 1 operate in parallel and execute the predetermined processes.

In storing step 101, the system information storage sections 3 store the access information indicating the attributes for accessing the storage 7 in the processing unit 1 and the storages 7 in other processing units 1 by relating the information to the data. At the same time, the system information storage sections store the space identifying information for identifying the plural kinds of virtual spaces allocated according to the applications of the storages 7.

In address translating step 102, the virtual addresses are translated into real addresses on the basis of the access information. In this step 102, a plurality of address translations are performed.

In selecting step 103, one of the plurality of address translations is selected based on the space identifying information.

In transfer control step 104, the data are read from the storages 7 and transferred together with the access information and the space identifying information to other processing units 1 on the basis of the real addresses translated by the address translation selected in selecting step 103.

The thus constructed system is capable of independently utilizing the individual spaces by providing the plurality of virtual spaces. Hence, when updating the address translation section in a certain space, synchronization may be taken between a minimum number of processors required. An overhead incidental to the operation for taking the synchronization can be reduced.

[Embodiment 2]

Figure 3:
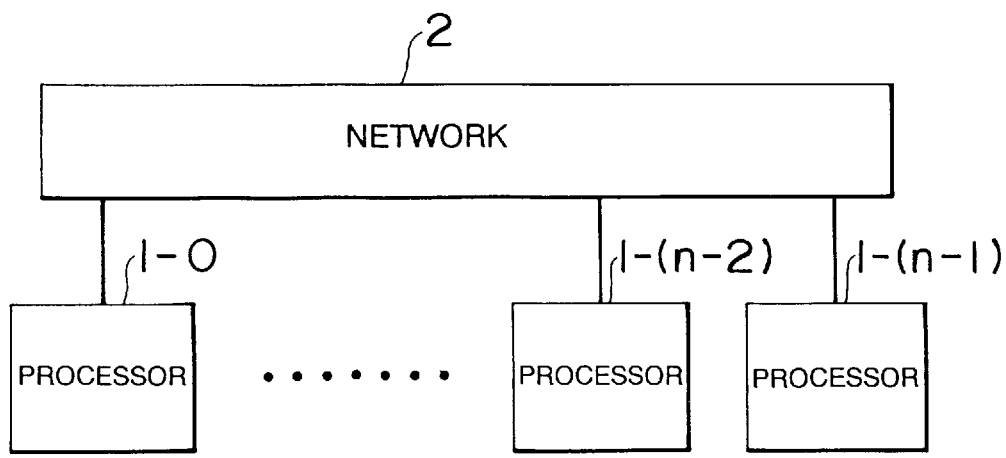
FIG. 3 is a block diagram illustrating an architecture of the multiprocessor system to which the data transfer system is applied in a second embodiment of the present invention.
Figure 4:
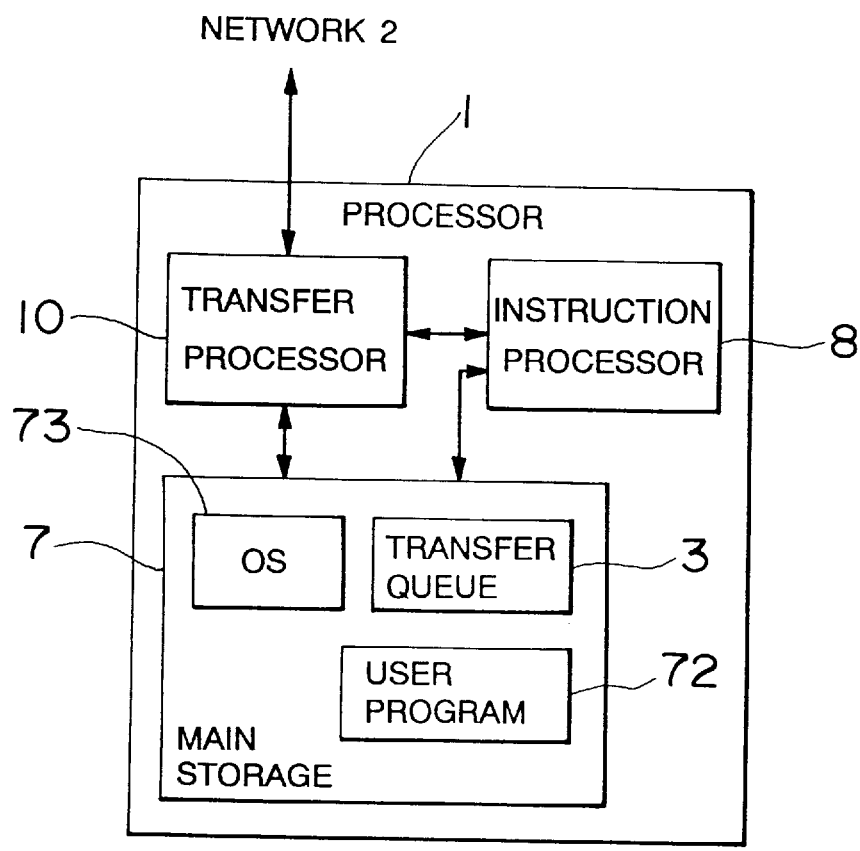
FIG. 4 is block diagram illustrating a construction of a processor in the system of FIG. 3.

FIG. 3 is a block diagram illustrating an architecture of a multiprocessor system to which the data transferring/processing system is applied in a second embodiment of the present invention. FIG. 4 is a block diagram showing a configuration of each of the processors constituting the system of FIG. 3.

<Construction of Embodiment 2>

The multiprocessor system is provided with a plurality of processors 1-0~1-(n−1) (the plurality of processors 1-0~1-(n−1) are represented by [processor 1]). The multiprocessor system includes a network 2 for connecting the plurality of processors (1-0~1-(n−1)) and transmitting/receiving the data between the processors 1.

Each of the processors 1-0~1-(n−1) has, as illustrated in FIG. 4, the main storage 7, an instruction processing section 8 and a transfer processing section 10.

The main storage 7 stores a user program 72 consisting of a plurality of instructions and various items of data. Stored also in the main storage 7 is a transfer queue 3 registered with headers containing the access information indicating the access attributes for accessing the main storage 7 provided in the processor 1 to which the data is to be transmitted and the main storage 7 provided in the processor 1 which is to receive the data. An operating system (OS) 73 incorporated in the main storage 7 stores each entry of an address translation table 4 which will be mentioned later with, e.g., 32-bit address translation information.

Figure 5:
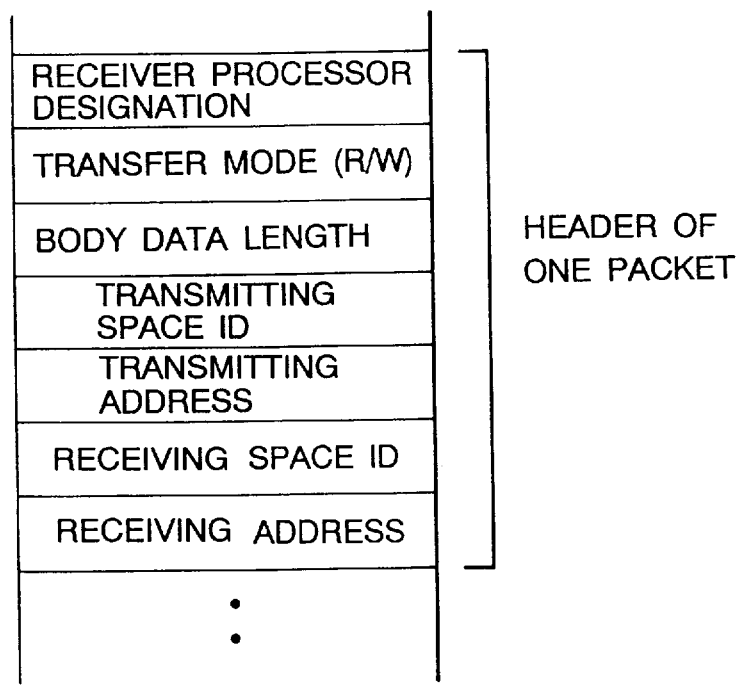
FIG. 5 is a diagram showing a structure of a transfer queue in the system of FIG. 3.

FIG. 5 is a diagram showing a structure of the transfer queue 3. As illustrated in FIG. 5, the headers for one packet are stored in the transfer queue 3.

The 1-packet headers contain pieces of information about a designation of the receiving processor, a transfer mode, a body data length, transmitting space ID (identifier), a transmission address, a receiving space ID and a receiving address.

The information on the designation of the receiving processor indicates a serial number of the processor which is to receive the data. The transfer mode information shows a transfer mode of data read (R) or data write (W). The body data length information indicates the number of bytes of the body data designated by the header. The transmission address information shows an address of to-be-transmitted data stored in the main storage 7 on the transmission side. The receiving address information indicates an address of data to be stored in the main storage 7 on the receiving side.

The information on the transmitting space ID serves to identify a global transmitting space with a local transmitting space. The information on the receiving space ID serves to identify a global receiving space with a local receiving space. A packet consists of headers and body data designated by the headers.

The instruction processing section 8 connected to the main storage 7 fetches a command out of the program of the main storage 7 and executes this instruction. The transfer processing section 10 is connected to the instruction processing section 8 as well as to the main storage 7. The transfer processing section 10 transfers the packet between the main storage 7 and the network 2.

Figure 6:
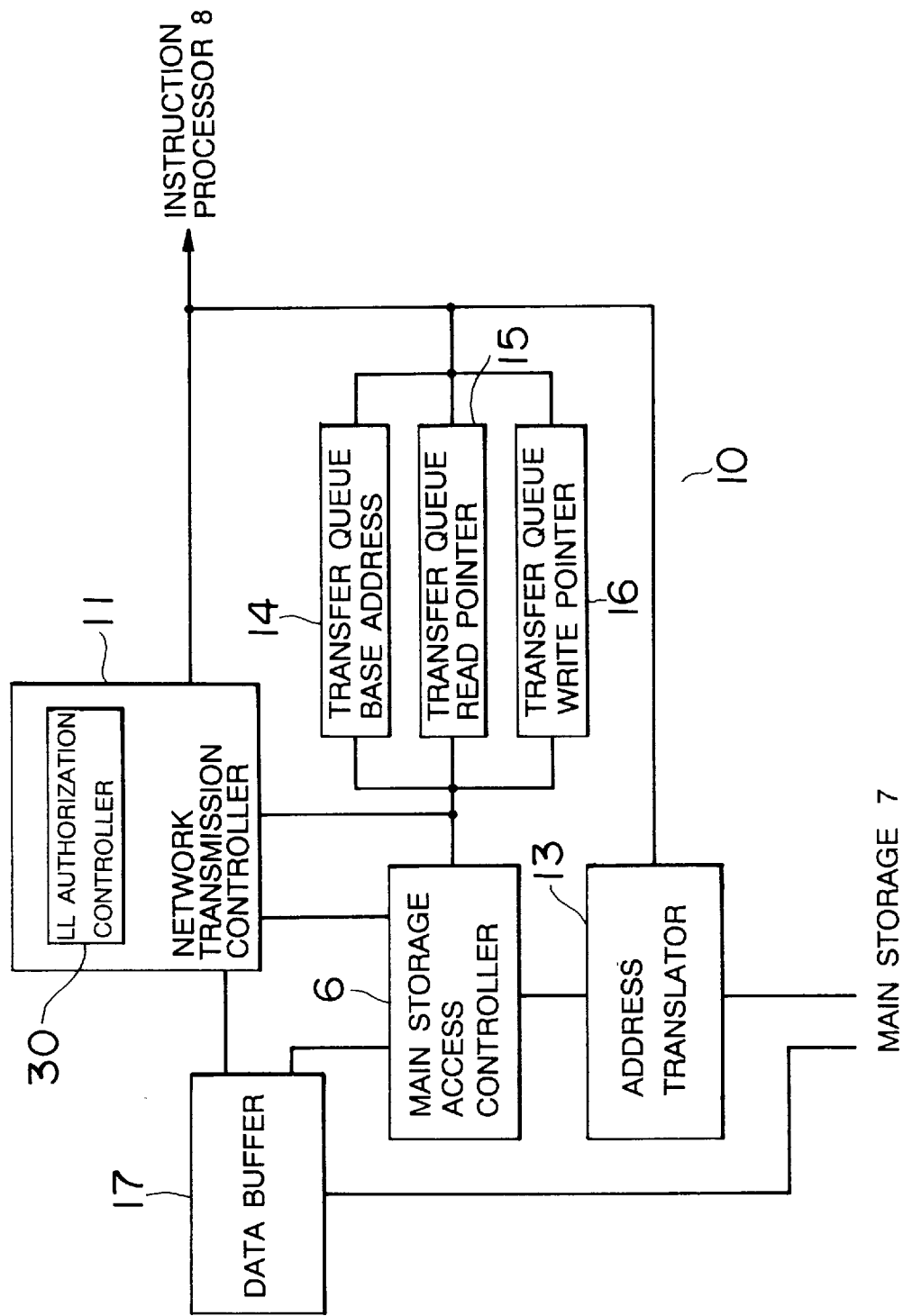
FIG. 6 is a block diagram showing a construction of a transfer processing section in the system of FIG. 3.

FIG. 6 is a block diagram illustrating a configuration of the transfer processing section 10.

The transfer processing section 10 includes a network transfer control section 11, a main storage access control section 6, an address translating section 13, a transfer queue base address section 14, a transfer queue read pointer section 15, a transfer queue write pointer section 16 and a data buffer 17.

The transfer queue base address section 14 is a register for retaining a head address of the transfer queue 3 in the main storage 7. The transfer queue write pointer section 16 is a register for retaining a write pointer value showing where the instruction processing section 8 enqueues the access information (transfer request) in the transfer queue 3. The transfer queue read pointer section 15 is a register for retaining a read pointer value indicating where the network transfer control section 11 finishes the transfer of the data in the transfer queue 3.

The instruction processing section 8 updates and/or refers to respective values of the transfer queue base address section 14, the transfer queue read pointer section 15 and the transfer queue write pointer section 16.

The network transfer control section 11 is actuated by a command issued from the instruction processing section 8. The network transfer control section 11 starts transferring the data on the basis of a read pointer value of the transfer queue read pointer section 15 and a write pointer value of the transfer queue write pointer section 16. Further, the network transfer control section 11 gives a main storage access request to the main storage access control section 6 to read the body data and the header of the packet to be transferred. The network transfer control section 11 transmits the packet read from the main storage 7 to the network 2 via the data buffer 17.

The main storage access control section 6 accesses the main storage 7 in response to the main storage access request given from the network transfer control section 11. The main storage access control section 6 controls a packet transfer between the main storage 7 and the data buffer 17.

The data buffer 17 temporarily stores the data when transferring the data between the main storage 7 and the network 2. At the same time, the data buffer 17 temporarily stores the data when reading or writing the data of the main storage which are required by the network transfer control section 11 and the main storage access control section 6.

The address translating section 13 effects the address translation on the basis of a value of an in-header designated space ID for accessing the main storage 7. The address translating section 13 thereby generates an access address to the maim storage 7.

Figure 7:
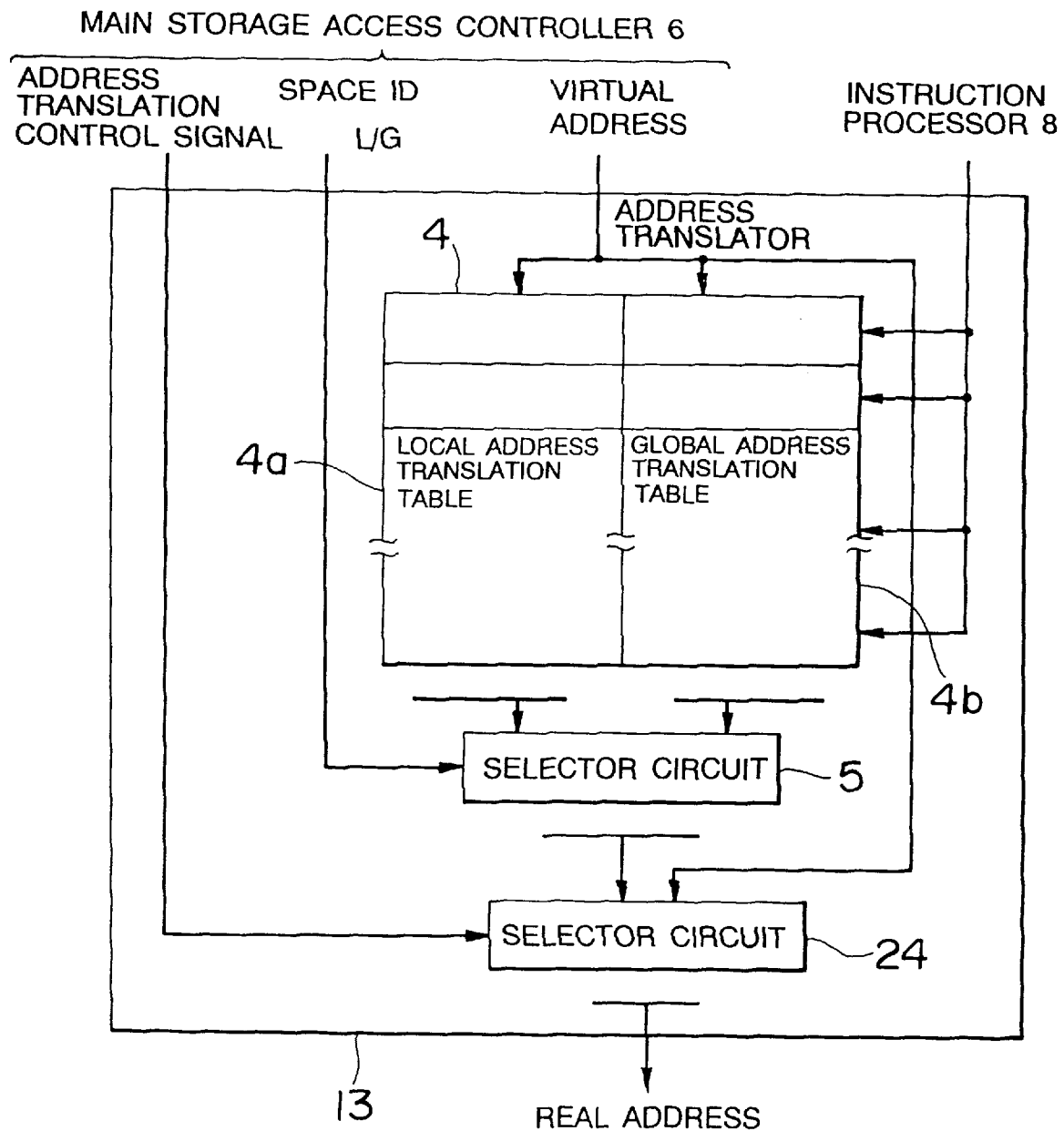
FIG. 7 is a block diagram illustrating a construction of an address translation section in the system of FIG. 3.

FIG. 7 is a block diagram illustrating a configuration of the address translating section 13. The address translating section 13 translates a virtual address (logical address) into a real address (physical address). The address translating section 13 has the address translation table 4 and selection circuits 23, 24.

The address translation table 4 includes a local address translation table 4a and a global address translation table 4b. The local address translation table 4a corresponds to the transmitting space ID="0" and serves for translating the virtual addresses into real addresses to access a local space intrinsic to each processor. The global address translation table 4b corresponds to the transmitting space ID="1" and serves for translating the virtual addresses into real addresses to access a global space employed as a space shared among the processors.

Figure 8:
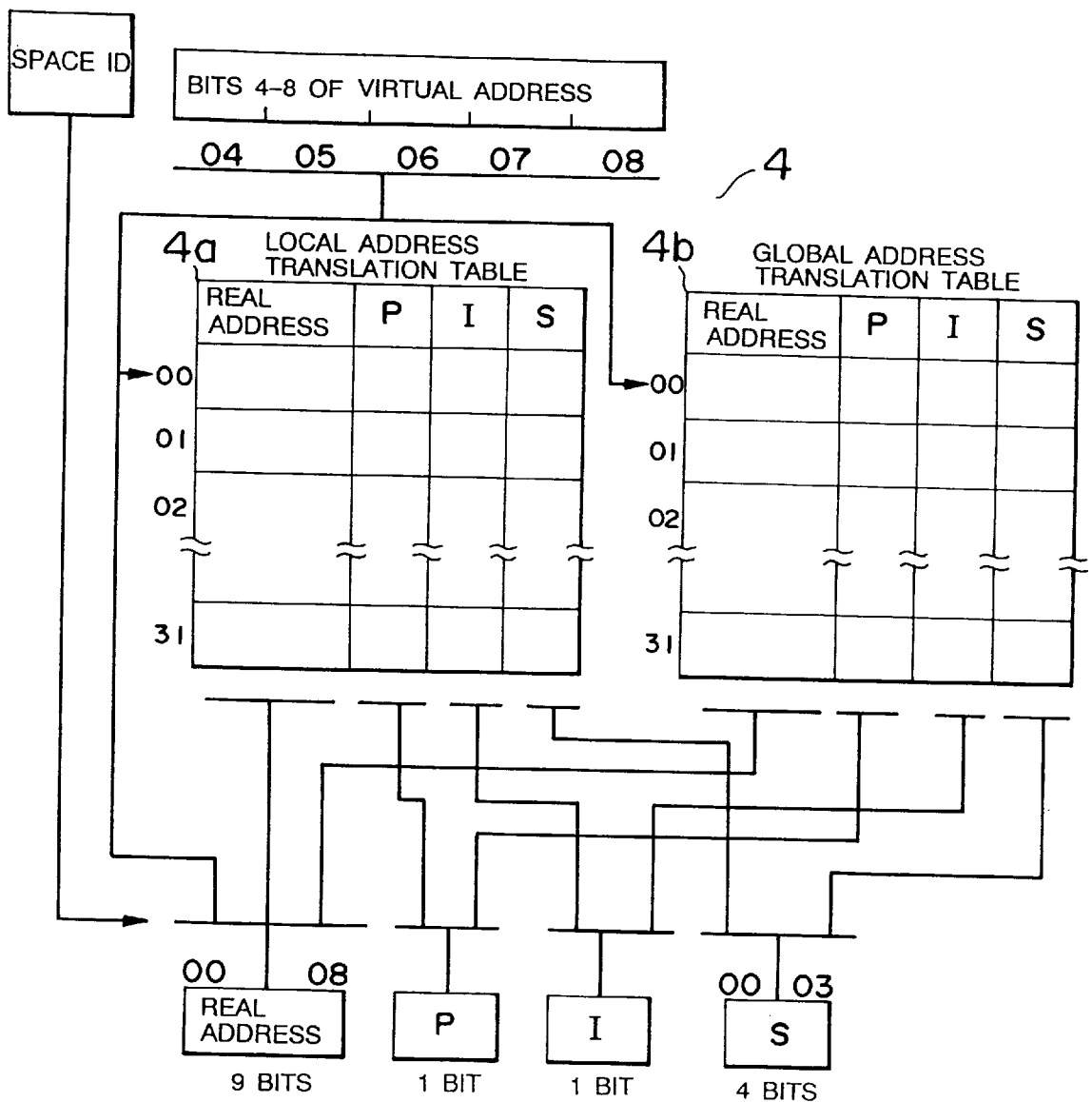
FIG. 8 is an explanatory schematic diagram showing actions of the address translation section in the system of FIG. 3.

The local and global address translation tables 4a, 4b have a plurality of entries corresponding to the number of bits of the virtual addresses. FIG. 8 shows a course of translation in the address translation table 4. In an example shown in FIG. 8, it is assumed that, e.g., 5-bit information is in the virtual address. The translation tables 4a, 4b have 32 entries from 00 to 31 corresponding to pieces of 5-bit information. The address translation table 4 selects the entries of the local and global address translation tables 4a, 4b in accordance with values of the virtual addresses sent from the main storage access control section 6.

Figure 9:
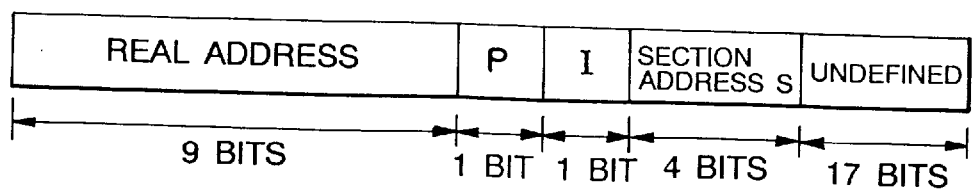
FIG. 9 is an explanatory diagram showing contents of an address translation table in the system of FIG. 3.

As shown in FIG. 9, information about section address S of 4 bits, invalid bit I of 1 bit, access protection bit P of 1 bit, and 9 bits of information about a real address are stored in each entry of the translation tables 4a and 4b. The real address corresponds to the above 9 bits of an address translated from a virtual address.

The 4 bits of the section address shown in FIG. 9 are used for comparison with the upper 4 bits of the virtual address supplied from the main storage access control section 6. If the virtual address and the section address agree, access to the main storage 7 is made. If they do not agree, "EXCEPTION" is detected.

If invalid bit "1" indicating that the data write and data read are invalid is set in the invalid bit I, and when accessing a storage area corresponding to the entry, "EXCEPTION" is detected. If invalid bit "0" is set therein, the data are written and read.

If bit "0" is set in the access protection bit P, and when effecting a read access to an area corresponding to the entry, the data are read. If bit "1" is set therein, when performing a write access, "EXCEPTION" is detected. The real address is an address after executing an address translation of the virtual address.

The address translation table 4 serves to, if "EXCEPTION" is not detected in the 32-bit information of the entry which corresponds to the virtual address in the entries of the translation tables 4a, 4b, output the 32-bit information containing the real address of the relevant entry to the selection circuit 5.

The space ID designated by the header in the transfer queue 3 is inputted via the main storage access control section 6 to the selection circuit 5. This selection circuit 5 selects any one of the local and global address translation tables 4a, 4b in accordance with this space ID.

An address translation control signal is inputted to the selection circuit 24. This selection circuit 24 selects any one of the translation address given from the selection circuit 5 and the virtual address given from the main storage access control section 6 in accordance with the address translation control signal. The address selected by the selection circuit 24 is employed as a real address when accessing the main storage 7.

Figure 10:
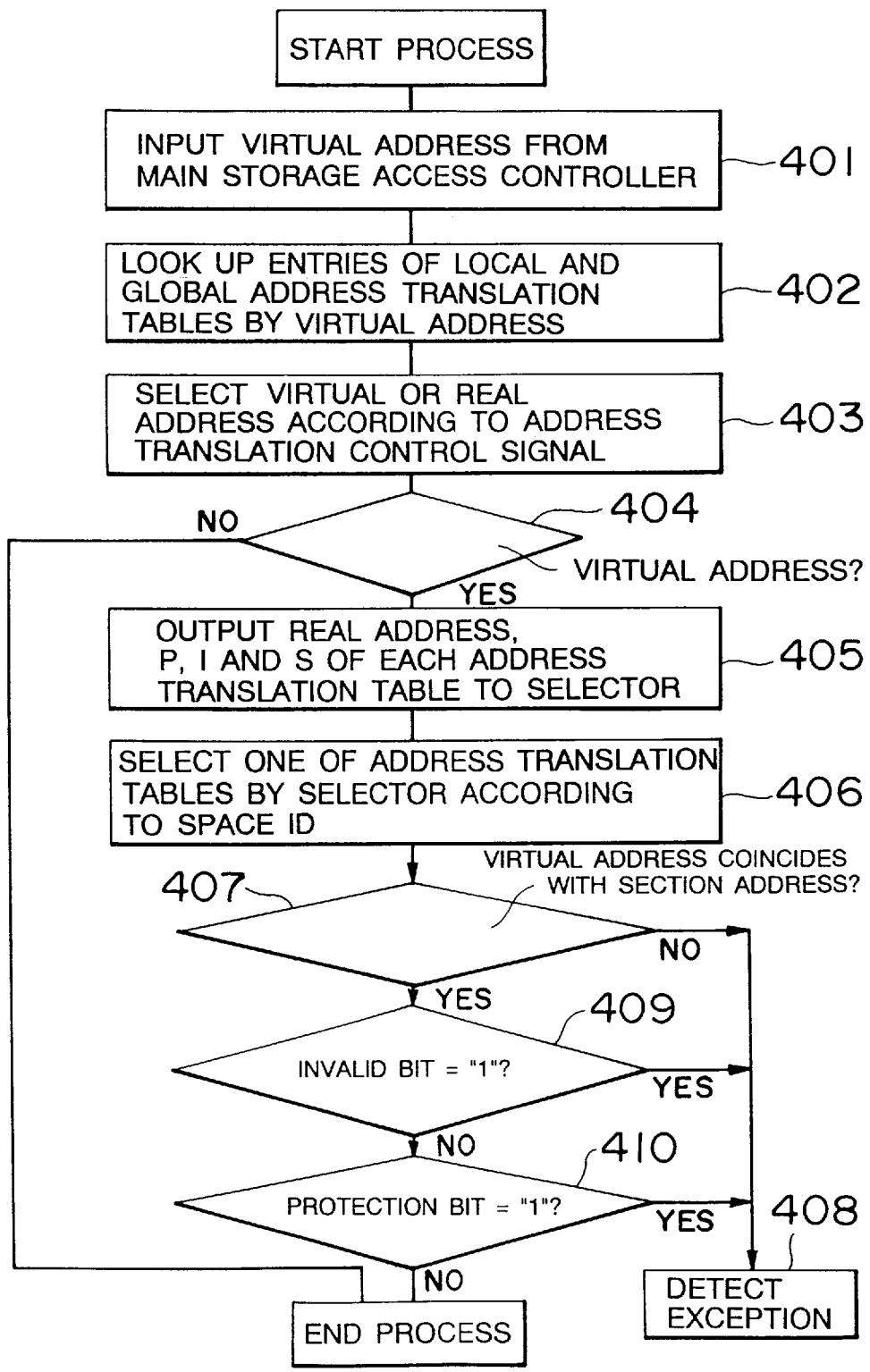
FIG. 10 is an explanatory flowchart showing actions of the address translation section in the system of FIG. 3.
Figure 11:
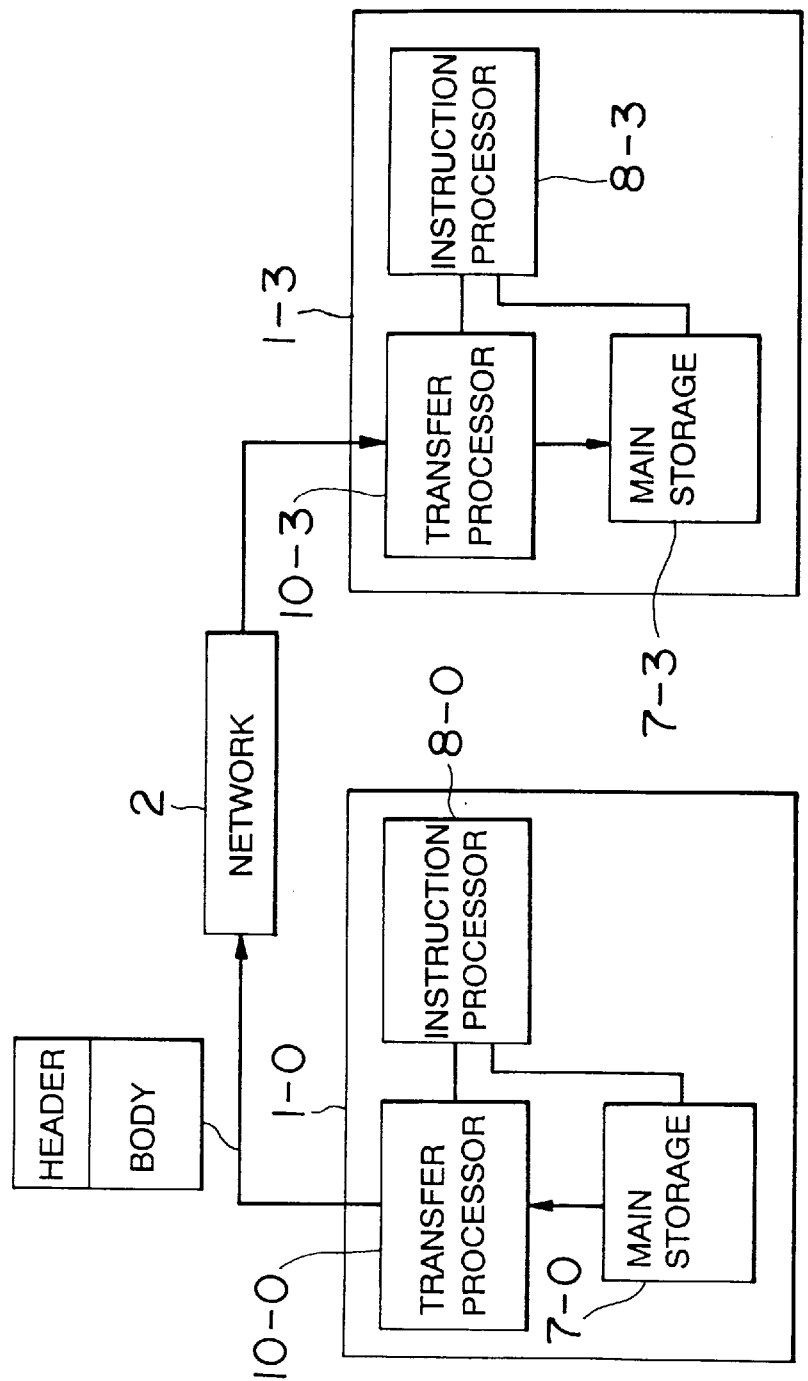
FIG. 11 is an explanatory schematic block diagram showing an action of write accessing in the system of FIG. 3.
Figure 12:
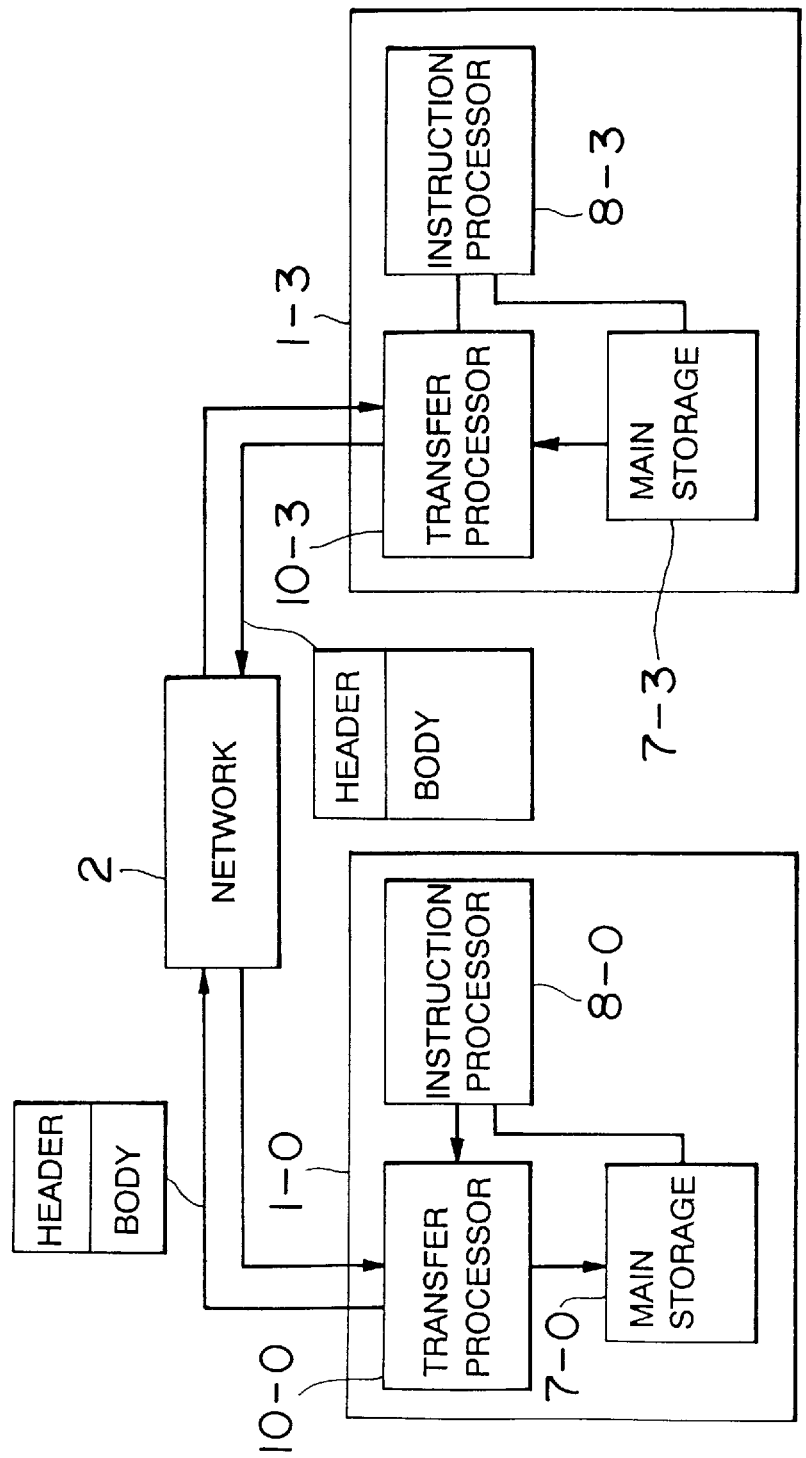
FIG. 12 is an explanatory schematic block diagram showing an action of read response accessing in the system of FIG. 3.

FIG. 10 is a flowchart of processes by the address translation section 13. FIG. 11 is an explanatory schematic block diagram showing an action of the write access. FIG. 12 is an explanatory schematic block diagram showing an action of the read access.

When executing the data write access from the processor 1-0 to the processor 1-3, the following process is conducted (see FIG. 11).

An instruction processing section 8-0 indicates a transfer of the data of a main storage section 7-0 to a transfer processing section 10-0, the transfer processing section 10-0 at first reads the header from the main storage section 7-0. The transfer processing section 10-0 next reads and transfers the body data in packet to the network 2. Subsequently, a transfer processing section 10-3 writes the packet to a main storage section 7-3.

When executing the data read response access from the processor 1-0 to the processor 1-3, the following process is performed (see FIG. 12).

When the instruction processing section 8-0 indicates a transfer of the data of the main storage section 7-3 to the transfer processing section 10-0, the transfer processing section 10-0 sends, to the transfer processing section 10-3, a small quantity of headers and body data by way of a read request showing which data to read.

Next, the transfer processing section 10-3 makes a read response by reading the packet consisting of the headers and the body data from the main storage section 7-2 in accordance with the request header. Subsequently, the transfer processing section 10-0 writes the packet to the main storage section 7-0.

Figure 13:
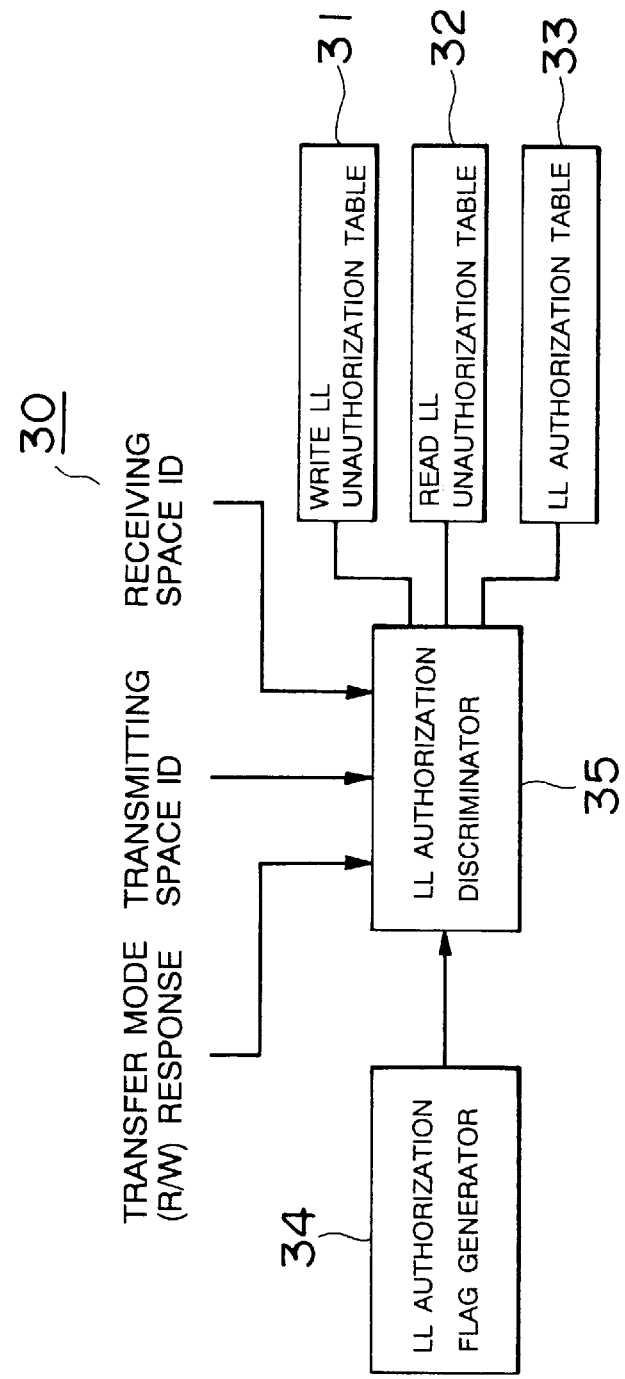
FIG. 13 is a block diagram illustrating a construction of an LL authorization control section in the system of FIG. 3.

The network transfer control section 11 includes, as illustrated in FIG. 6, an LL authorization control section 30 for controlling an authorization of a write and/or read response of the data between address spaces of the transmitting and receiving processors. FIG. 13 is a block diagram illustrating a configuration of the LL authorization control section.

An LL authorization flag generating section 34 generates an LL authorization flag "1" for authorizing the write or read response of the data between the local space of the transmitting processor and the local space of the receiving processor. The LL authorization flag generating section 34 generates alternatively an LL authorization flag "0" for making unauthorized the write or read response of the data between the local spaces.

A write LL unauthorization table 31 corresponds to the LL authorization flag "0" and registers the authorization or unauthorization of the data write between the space of the transmitting processor and the space of the receiving processor. As shown in FIG. 14, the write LL unauthorization table 31, if the space owned by the receiving processor is defined as a local space, makes the data write unauthorized.

A read LL unauthorization table 32 corresponds to the LL authorization flag "0" and registers the authorization or unauthorization of the data read response between the space of the transmitting processor and the space of the receiving processor. As illustrated in FIG. 15, the read LL unauthorization table 32, if the space owned by the transmitting processor is defined as a local space, makes the data read unauthorized.

An LL authorization table 33 corresponds to the LL authorization flag "1" and registers the authorization in either the data write or the data read response between the space of the transmitting processor and the space of the receiving processor. As shown in FIG. 16, the LL authorization table 33 authorizes the write and read of the data irrespective of whether each space of transmitting and receiving processors is a global or local space.

An LL authorization discriminating section 35 selects any one of the tables 31, 32, 33 by referring to the LL authorization flag from the LL authorization flag generating section 34, the transfer mode of the write or read response, the transmitting space ID and the receiving space ID. The LL authorization discriminating section 35 then discriminates the authorization of the space-to-space data transfer.

<Operation of Embodiment 2>

Figure 17:
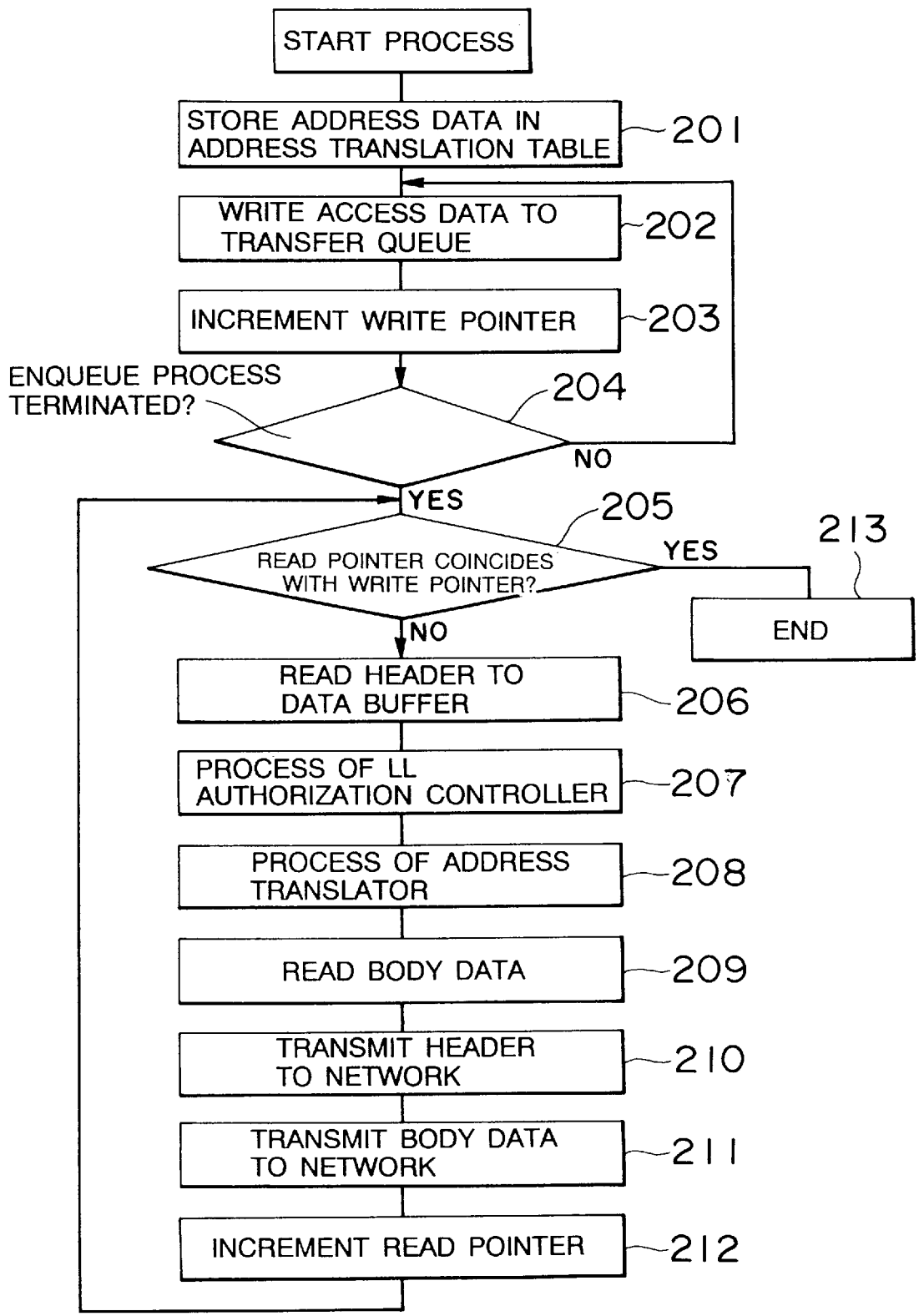
FIG. 17 is an explanatory flowchart showing actions of the system of FIG. 3.

Next, the system operation will be explained with reference to a flowchart showing the processes by the multiprocessor system in a second embodiment illustrated in FIG. 17. The operating system 73, before executing an instruction of the user program 72, stores each entry of the address translation table 4 with the 32-bit address translation information (step 201).

The instruction processing section 8 for executing the instruction of the user program 72 writes, to the transfer queue 3 in the main storage 7, the information by way of the access information for requesting the data transfer in a packet header format as illustrated in FIG. 5 (step 202), the foregoing information concerning the designation of the receiving processor, the body data length, the transmitting address, the receiving address, the transmitting space ID, the receiving space ID and others. Herein, a position of the transfer queue 3 in the main storage 7 is expressed by the following formula:

Position=Transfer Queue Base Address+Transfer Queue Write Pointer×Header Length

Next, the instruction processing section 8 for executing the instruction of the user program 72 increments a write pointer value of the transfer queue write pointer section 16 (step 203).

Thereafter, the instruction processing section 8 for executing the instruction of the user program 72 repeatedly performs both writing of the access information of the transfer request to the transfer queue 3 and incrementing of the write pointer value of the transfer queue write pointer section 16. Whether the writing process to the transfer queue 3, i.e., the enqueue process is finished or not is thus decided (step 204).

The network transfer control section 11 is actuated through the indication from the instruction processing section 8 and waits for an end of the enqueue process of the transfer request. Next, the network transfer control section 11, when the instruction processing section 8 has finished the enqueue process, decides whether or not a value of the transfer queue read pointer coincides with a value of the transfer queue write pointer (step 205).

Herein, if the value of the transfer queue read pointer does not coincide with the value of the transfer queue write pointer, the network transfer control section 11 starts the transfer on the assumption that there is a unprocessed transfer request. The network transfer control section 11 gives a main storage access request to the main storage access control section 6 to read the header of a transfer packet.

The main storage access control section 6 calculates an address on the main storage 7 with respect to the packet header of the oldest unprocessed transfer request on the basis of the transfer queue base address and the transfer queue read pointer. The main storage access control section 6 executes a read access to the transfer queue 3 of the main storage 7 through the address translation section 13.

When the packet header is read from the transfer queue 3 of the main storage 7, the main storage access control section 6 causes the data buffer 17 to store the packet header and simultaneously informs the network transfer control section 11 of an end of reading of the packet header (step 206).

Next, the main storage access control section 6 reads the transfer mode, the transmitting space ID and the receiving space ID from the header stored in the data buffer 17. The LL authorization control section 30 provided in the network transfer control section 11 executes a process as to whether or not the data transfer should be authorized in conformity with the tables 31~33 by referring to the transfer mode, the transmitting space ID, the receiving space ID and the LL authorization flag (step 207).

FIG. 18 is a flowchart showing the process by the LL authorization discriminating section 35. The LL authorization discriminating section 35 discriminates whether or not the LL authorization flag from the LL authorization flag generating section 34 is "0" (step 301). Herein, if the LL authorization flag is "0", the LL authorization discriminating section 35 discriminates whether or not the transfer mode is a write (W) mode (step 302).

Herein, if the transfer mode is the write (W) mode, whether or not the receiving space ID is defined as a global space is decided (step 303). If the receiving space ID is the global space, the LL authorization section 35 authorizes the receiving processor to write the data by referring to the write LL unauthorization table 31 (step 304).

While on the other hand, if the receiving space ID is a local space, the LL authorization discriminating section 35 does not authorize the receiving processor to write the data by referring to the write LL unauthorization table 31 (step 305).

Further, the LL authorization discriminating section 35 discriminates whether or not the transfer mode is a read response (R) mode (step 306). If discriminated to be the read response (R) mode, the discriminating section 35 decides whether the transmitting space ID is a global space or not (step 307).

Herein, if the transmitting space is the global space, the LL authorization discriminating section 35 authorizes the transmitting processor to read the data by referring to the read LL unauthorization table 32 (step 308).

While on the other hand, if the transmitting space ID is the local space, the LL authorization discriminating section 35 does not authorize the transmitting processor to read the data by referring to the read LL unauthorization table 32 (step 309). Incidentally, if the transfer mode is not the read response (R) mode, the authorization for reading the data is given to the transmitting processor (step 310).

As discussed above, the local space is not normally designated as a destination to which the data or the read response is written, and, therefore, the LL authorization flag is set to "0". Accordingly, when the data transfer is indicated, the space can be protected from a destruction due to a deliberation or a mistake in the program by generating "EXCEPTION".

On the other hand, if the LL authorization flag is "1", the LL authorization discriminating section 35 gives the authorization for writing and reading the data by referring to the LL authorization table 33 (step 311).

When executing the data processing at a high speed by optimizing he program, the constraint to inhibit the data transfer between the local spaces may be an obstacle. In this case, the data are transferred between the local spaces by setting the LL authorization flag to "1". The data transfer overhead is thereby eliminated, with the result that the program can be executed at the high speed.

Then, if the LL authorization discriminating section 35 gives an unauthorization for the data transfer, the network transfer control section 11 restrains the data transfer and makes a notification to that effect by generating an interruption to the instruction processing section 8.

Whereas the data transfer is authorized by the authorization discriminating section 35, there is calculated an address of the body data of the packet by further fetching the access information for transferring the transmitting and receiving addresses. Effected is a reading access to the main storage 7 through the address translation section 13.

At this time, the address translation section 13 executes a process as shown in FIG. 10. Five bits of 4~8 of the virtual address are inputted from the main storage access control section 6 (step 401). Next, an entry of the local address translation table 4a and an entry of the global address translation table 4b are retrieved based on the virtual address (step 402).

Next, the selection circuit 24 receives an address translation control signal indicating whether the virtual address is to be translated into a real address or not. The selection circuit 24 then selects any one of the translation address from the selection circuit 5 and the virtual address from the main storage access control section 6 in accordance with this address translation control signal (step 403). This selected address becomes a real address when accessing the main storage 7.

Decided further is whether the selected address is a virtual address or not (step 404). Herein, if the selected address is not the virtual address, the process comes to an end.

Whereas if the selected address is the virtual address, the address translation table 4 outputs, to the selection circuit 5, the real address, P, I and S corresponding to the entries of the translation tables 4a, 4b (step 405).

Subsequently, the selection circuit 5 selects any one of the local address translation table 4a and the global address translation table 4b in accordance with the space ID from the main storage access control section 6 (step 406).

Decided further is whether or not the high-order 4 bits of the virtual address coincide with 4 bits of the section address (step 407). Herein, if the virtual address is not coincident with the section address, "EXCEPTION" of the access to the main storage 7 is detected (step 408).

Next, if the virtual address is coincident with the section address, there is subsequently decided whether the invalid bit is "1" or not (step 409). Herein, if the invalid bit is "1", "EXCEPTION" of writing and reading the data is detected (step 408).

Next, if the invalid bit is "0", whether or not the access protection bit is "1" is decided (step 410). Herein, if the access protection bit is "1", the write access is executed, and it follows that "EXCEPTION" is detected (step 408).

Subsequently, if the access protection bit is "0", the read access to an area corresponding to the entry is executed to read the data. The process is thus ended.

If the global space address table 4b is selected in relation to the space ID, the global space is common between the processors. Therefore, when rewriting the address translation information of the global address translation table 4b, the synchronization is taken between all the processors.

While on the other hand, if the local space address table 4a is selected in relation to the space ID, the local space is intrinsic to each processor. Hence, the address translation information of the local address translation table 4a is rewritten independently of other processors. In the case of rewriting only the local address translation table 4a, the synchronization between the processors is not required. Accordingly, the translation table can be rewritten with a less amount of overhead. Note that a rewriting frequency of the local address translation table 4a is higher than that of the global address translation table 4b.

The local address translation table 4a or the global address translation table 4b is thus selected. The virtual address is translated into a real address in accordance with the selected translation table. Items of body data of the packet are sequentially read from the main storage 7. The main storage access control section 6 causes the data buffer 17 to sequentially store these items of body data. The network transfer control section 11 is sequentially informed of a read quantity of the body data (step 209).

The network transfer control section 11, when informed of an end of reading the packet header from the main storage access control section 6, fetches the access information of the transfer request from the data buffer 17. The control section 11 then effects a necessary check and modification about the access information. Such access information is written back to the data buffer 17.

Next, the network transfer control section 11 sends the packet headers to the networks 2 from the data buffer 17 (step 210). Further, the network transfer control section 11, when sequentially informed of the read quantity of the packet body data from the main storage access control section 6, sequentially sends the packet bodies stored in the data buffer 17 to the networks 2 (step 211).

When the packet sending from the transfer processing section 10 to the networks 2 has been finished in this manner, the network transfer control section 11 increments the transfer queue read pointer (step 212). The control section 11 then returns to the process in step 205. Then, the network transfer control section 11 compares a value of the transfer queue read pointer with a value of the transfer queue write pointer. If the read pointer is not coincident with the write pointer, i.e., when an unprocessed transfer request is left, the next transfer process is to be executed (steps 206~212). Then, the data transfer process is repeatedly performed until the value of the transfer queue read pointer becomes identical with the value of the transfer queue write pointer. If the two values are identical with each other, the data transfer process is ended (step 213).

As described above, in the data transferring/processing system for performing the data communications between the plurality of processors of the multiprocessor system, the individual spaces can be independently employed by providing the two kinds of virtual spaces, viz., the global and local spaces. When the updating the global address translation table 4b, the processor-to-processor synchronization is thereby taken. Besides, when updating the local address translation table 4a, the processor-to-processor synchronization is not required. It is therefore possible to reduce the overhead of the operating system.

Moreover, on the occasion of the write transfer, the local space can be protected by inhibiting the write to the local space. Further, the overhead of the data transfer is reduced by permitting the local-to-local data transfer with respect to a certain program by controlling the LL authorization flag. The write to the local space is inhibited with respect to other programs. The local spaces can be thereby flexibly protected in accordance with the programs.

It is apparent that, in this invention, a wide range of different working modes can be formed based on the invention without deviating from the spirit and scope of the invention. This invention is not restricted by its specific working modes except being limited by the appended claims.

What is claimed is:

1. A data transferring and processing method of transferring data and system information between a plurality of processors to execute processes in parallel by said processors, said method comprising the steps of:

a storing step of storing, in a system information storage section of one of said plurality of processors, access information indicating attributes for accessing a storage device of said one processor and storage devices of other of said plurality of processors by relating said access information to said data and simultaneously storing, in said system information storage section, space identifying information for identifying plural kinds of virtual spaces in said system information storage section, said virtual spaces being allocated according to applications of said storage device;

an address translation step of performing a plurality of address translations for translating a plurality of virtual addresses into a plurality of real addresses corresponding respectively to said plural kinds of virtual spaces based on said access information stored in said system information storage section;

a selection step of selecting one of said performed plurality of address translations for translating one of said plurality of virtual addresses into one of said plurality of real addresses based on said space identifying information stored in said system information storage section; and a transfer step of transferring said data read from said storage device to said other processors together with said access information and said space identifying information based on said one real address translated by said address translation step and selected by said selection step.

2. A method according to claim 1, wherein said storing step includes a step of storing, in said system information storage section, said space identifying information for further identifying types of a global space used in common to all said processors and a local space used intrinsically to each of said processors as said plural kinds of virtual spaces, and said address translation step includes a local address translation step of translating a virtual address into a real address to access said local space and a global address translation step of translating said virtual address into said real address to access said global space.

3. A method according to claim 2, wherein said address translation step includes a step of causing information of said obtained-by-translation real addresses of said local space and of said global space to include invalid information indicating that data writing and reading are invalid and access protecting information indicating whether or not a write access is inhibited.

4. A method according to claim 1, wherein said transfer step includes a step of executing a transfer process by using a packet including headers having said access information and said space identifying information and body data related to said headers.

5. A method according to claim 4, wherein said transfer step further includes a step of reading said body data related to said headers to a data buffer from said storage device based on said headers by reading said headers to said data buffer from said system information storage section.

6. A method according to claim 1, wherein said storing step includes a step of storing information about a receiving processor designation, a data read/write transfer mode, a body data length, a transmitting address and a receiving address.

7. A data transferring and processing method of transferring data and system information between a plurality of processors to execute processes in parallel by said processors, said method comprising the steps of:

a storing step of storing, in a system information storage section of one of said plurality of processors, access information indicating attributes for accessing a storage device of said one processor and storage devices of other of said plurality of processors by relating said access information to said data and simultaneously storing, in said system information storage section, space identifying information for identifying plural kinds of virtual spaces in said system information storage section, said virtual spaces being allocated according to applications of said storage device;

an address translation step of performing a plurality of address translations for translating a plurality of virtual addresses into a plurality of real addresses corresponding respectively to said plural kinds of virtual spaces based on said access information stored in said system information storage section;

a selection step of selecting one of said performed plurality of address translations for translating one of said plurality of virtual addresses into one of said plurality of real addresses based on said space identifying information stored in said system information storage section; and a transfer step of transferring said data read from said storage device to said other processors together with said access information and said space identifying information based on said one real address translated by said address translation step and selected by said selection step, said storing step including an information writing step of sequentially writing said access information to said system information storage section while incrementing a pointer value of a write pointer indicating a position to which said access information is written in said system information storage section.

8. A method according to claim 7, wherein said transfer step includes a transfer control step of deciding whether or not a read pointer value indicating an end position of read/write processes of said data in said system information storage section is coincident with said write pointer value and executing, if said read pointer value is not coincident with said write pointer value, said read/write processes of said data until said read pointer value coincides with said write pointer value.

9. A data transferring and processing method of transferring data and system information between a plurality of processors to execute processes in parallel by said processors, said method comprising the steps of:

a storing step of storing, in a system information storage section of one of said plurality of processors, access information indicating attributes for accessing a storage device of said one processor and storage devices of other of said plurality of processors by relating said access information to said data and simultaneously storing, in said system information storage section, space identifying information for identifying plural kinds of virtual spaces in said system information storage section, said virtual spaces being allocated according to applications of said storage device;

an address translation step of performing a plurality of address translations for translating a plurality of virtual addresses into a plurality of real addresses corresponding respectively to said plural kinds of virtual spaces based on said access information stored in said system information storage section;

a selection step of selecting one of said performed plurality of address translations for translating one of said plurality of virtual addresses into one of said plurality of real addresses based on said space identifying information stored in said system information storage section; and a transfer step of transferring said data read from said storage device to said other processors together with said access information and said space identifying information based on said one real address translated by said address translation step and selected by said selection step, said selection step including a step of selecting said one of said plurality of virtual addresses and said corresponding one of said plurality of real addresses based on said space identifying information in accordance with an address translation control information showing whether or not said one virtual address is translated into said one real address.

10. A data transferring and processing method of transferring data and system information between a plurality of processors to execute processes in parallel by said processors, said method comprising the steps of:

a storing step of storing, in a system information storage section of one of said plurality of processors, access information indicating attributes for accessing a storage device of said one processor and storage devices of other of said plurality of processors by relating said access information to said data and simultaneously storing, in said system information storage section, space identifying information for identifying pural kinds of virtual spaces in said system information storage section, said virtual spaces being allocated according to applications of said storage device;

an address translation step of performing a plurality of address translations for translating a plurality of virtual addresses into a plurality of real addresses corresponding respectively to said plural kinds of virtual spaces based on said access information stored in said system information storage section;

a selection step of selecting one of said performed plurality of address translations for translating one of said plurality of virtual addresses into one of said plurality of real addresses based on said space identifying information stored in said system information storage section;

a transfer step of transferring said data read from said storage device to said other processors together with said access information and said space identifying information based on said one real address translated by said address translation step and selected by said selection step; and a space authorization control step of determining whether to authorize at least one of a data write access and a data read response access between one of said virtual spaces of a transmitting processor to which said data is to be transmitted and one of said virtual spaces of a receiving processor which is to receive said data.

11. A method according to claim 10, wherein said space authorization control step includes a flag generating step of generating an authorization flag indicating whether to authorize said data transfer between said virtual spaces of said transmitting and receiving processors and a space authorization discriminating step of discriminating an authorization of said data transfer between said virtual spaces by referring to said authorization flag, a write/read response transfer mode, a transmitting space identifying information and a receiving space identifying information.

12. An apparatus for transferring and processing data, comprising:
   a plurality of processor means for executing predetermined processes in parallel;
   a plurality of storage means, each respectively provided to said plurality of processor means, for storing said data; and
   communication means for transferring said data and system information between said plurality of processor means for parallel operations of said plurality of processor means,
   each of said plurality of processing means including:
      system information storage means for storing access information indicating attributes for accessing one of said plurality of storage means corresponding to said respective one of said plurality of processor means and other of said plurality of storage means corresponding to said respective other of said plurality of processor means by relating said access information to said data and simultaneously storing space identifying information for identifying plural kinds of virtual spaces allocated according to applications of said one storage means;
      a plurality of address translating means for translating a plurality of virtual addresses into a plurality of real addresses respectively corresponding to said plural kinds of virtual spaces based on said access information stored in said system information storage means;
      selecting means for selecting one of said plurality of address translating means based on said space identifying information stored in said system information storage means; and
      transfer control means for reading said data from said one storage means based on said real address translated by said address translating means selected by said selecting means and for transferring said read data to said other processor means together with said access information and said space identifying information.

13. An apparatus according to claim 12, wherein said system information storage means stores said space identifying information for further identifying types of a global space used in common to all said processor means and a local space used intrinsically to said each processor means as said plural kinds of virtual spaces, and said address translating means includes local address translating means for translating a virtual address into a real address to access said local space and global address translating means for translating said virtual address into said real address to access said global space.

14. An apparatus according to claim 13, wherein said local address translating means includes a local address translation table for an address translation, and said global address translating means includes a global address translation table for the address translation.

15. An apparatus according to claim 14, wherein said local address translating means and said global address translating means include said local and global address translation tables which store invalid information showing that a write and a read of said data are inhibited and access protecting information indicating whether to inhibit a write access.

16. An apparatus according to claim 12, wherein said transfer control means includes means for performing a transfer process by using a packet including headers having said access information and said space identifying information and body data related to said headers.

17. An apparatus according to claim 16, further comprising data buffer means for retaining said headers and said data and being provided between said storage means and said communication means, and wherein said transfer control means includes means for reading said body data related to said headers from said storage means based on said headers by reading said headers from said system information storage means to said data buffer means.

18. An apparatus according to claim 12, wherein said system information storage means stores information about a receiving processor designation, a data read/write transfer mode, a body data length, a transmitting address and a receiving address.

19. An apparatus for transferring and processing data, comprising:
   a plurality of processor means for executing predetermined processes in parallel;
   a plurality of storage means, each respectively provided to said plurality of processor means, for storing said data; and
   communication means for transferring said data and system information between said plurality of processor means for parallel operations of said plurality of processor means,
   each of said plurality of processing means including:
      system information storage means for storing access information indicating attributes for accessing one of said plurality of storage means corresponding to said respective one of said plurality of processor means and other of said plurality of storage means corresponding to said respective other of said plurality of processor means by relating said access information to said data and simultaneously storing space identifying information for identifying plural kinds of virtual spaces allocated according to applications of said one storage means;
      a plurality of address translating means for translating a plurality of virtual addresses into a plurality of real addresses respectively corresponding to said plural kinds of virtual spaces based on said access information stored in said system information storage means;
      selecting means for selecting one of said plurality of address translating means based on said space identifying information stored in said system information storage means; and
   transfer control means for reading said data from said one storage means based on said real address translated by said address translating means selected by said selecting means and for transferring said read data to said other processor means together with said access information and said space identifying information,
   said system information storage means including write pointer means for retaining a position to which said access information has been written and information writing means for sequentially writing said access information to said system information storage means while incrementing a pointer value of said write pointer means.

20. An apparatus according to claim 19, wherein said transfer control means includes read pointer means for retaining a position where reading/transferring processes of said data in said system information storage means has been finished and read/transfer control means for deciding whether or not a read pointer value of said read pointer means coincides with a write pointer value of said write pointer section and executing, if said read pointer value does not coincide with said write pointer value, said reading/transferring processes of said data until said read pointer value coincides with said write pointer value.

21. An apparatus for transferring and processing data, comprising:

a plurality of processor means for executing predetermined processes in parallel;

a plurality of storage means, each respectively provided to said plurality of processor means, for storing said data; and communication means for transferring said data and system information between said plurality of processor means for parallel operations of said plurality of processor means, each of said plurality of processing means including:

system information storage means for storing access information indicating attributes for accessing one of said plurality of storage means corresponding to said respective one of said plurality of processor means and other of said plurality of storage means corresponding to said respective other of said plurality of processor means by relating said access information to said data and simultaneously storing space identifying information for identifying plural kinds of virtual spaces allocated according to applications of said one storage means;

a plurality of address translating means for translating a plurality of virtual addresses into a plurality of real addresses respectively corresponding to said plural kinds of virtual spaces based on said access information stored in said system information storage means;

selecting means for selecting one of said plurality of address translating means based on said space identifying information stored in said system information storage means; and transfer control means for reading said data from said one storage means based on said real address translated by said address translating means selected by said selecting means and for transferring said read data to said other processor means together with said access information and said space identifying information, said selecting means including a section circuit for selecting said one of said plurality of virtual addresses and said corresponding one of said plurality of real addresses based on said space identifying information in accordance with an address translation control signal indicating whether or not said virtual address is translated into said one real address.

22. An apparatus for transferring and processing data, comprising:

a plurality of processor means for executing predetermined processes in parallel;

a plurality of storage means, each respectively provided to said plurality of processor means, for storing said data; and communication means for transferring said data and system information between said plurality of processor means for parallel operations of said plurality of processor means, each of said plurality of processing means including:

system information storage means for storing access information indicating attributes for accessing one of said plurality of storage means corresponding to said respective one of said plurality of processor means and other of said plurality of storage means corresponding to said respective other of said plurality of processor means by relating said access information to said data and simultaneously storing space identifying information for identifying plural kinds of virtual spaces allocated according to applications of said one storage means;

a plurality of address translating means for translating a plurality of virtual addresses into a plurality of real addresses respectively corresponding to said plural kinds of virtual spaces based on said access information stored in said system information storage means;

selecting means for selecting one of said plurality of address translating means based on said space identifying information stored in said system information storage means;

transfer control means for reading said data from said one storage means based on said real address translated by said address translating means selected by said selecting means and for transferring said read data to said other processor means together with said access information and said space identifying information; and space authorization control means for controlling an authorization of a write/read response access of said data between said virtual space of a transmission processing means to which said data is to be transmitted and said virtual space of a receiving processing means which is to receive said data.

23. An apparatus according to claim 22, wherein said space authorization control means includes an authorization flag generating section for generating an authorization flag indicating whether to authorize a data transfer between said virtual spaces of said transmission processing mean and of said receiving processing means and a space authorization discriminating section for discriminating the authorization of the data transfer between said virtual spaces by referring to said authorization flag, a write/read response transfer mode, a transmitting space identifying information and a receiving space identifying information.

24. An apparatus according to claim 23, wherein said space authorization discriminating section includes a write unauthorization table registered with an authorization/unauthorization of data writing between said virtual spaces, a read unauthorization table registered with an authorization/unauthorization of the data read response between said virtual spaces and an authorization table registered with an authorization of the data write and the data read response between said virtual spaces, and said space authorization discriminating section includes a means for discriminating an authorization of the data transfer between said virtual spaces by referring to said tables corresponding to said authorization flag, said write/read response transfer mode, said transmitting space identifying information and said receiving space identifying information.

* * * * *